United States Patent
Chou

(10) Patent No.: US 7,990,024 B2
(45) Date of Patent: Aug. 2, 2011

(54) NANOGENERATOR

(75) Inventor: Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 297 days.

(21) Appl. No.: 12/349,616

(22) Filed: Jan. 7, 2009

(65) Prior Publication Data

US 2009/0309458 A1   Dec. 17, 2009

(30) Foreign Application Priority Data

Jun. 13, 2008   (CN) .......................... 2008 1 0302141

(51) Int. Cl.
*H01L 41/113* (2006.01)
(52) U.S. Cl. ....................... 310/339; 310/366
(58) Field of Classification Search .................. 310/339, 310/365, 366
See application file for complete search history.

(56) References Cited

U.S. PATENT DOCUMENTS

| | | | |
|---|---|---|---|
| 2007/0018537 A1* | 1/2007 | Pinkerton et al. | 310/339 |
| 2009/0115293 A1* | 5/2009 | Wang et al. | 310/364 |
| 2009/0309456 A1* | 12/2009 | Stollberg | 310/319 |

* cited by examiner

*Primary Examiner* — Derek J Rosenau
(74) *Attorney, Agent, or Firm* — Clifford O. Chi

(57) ABSTRACT

A nanogenerator includes a first frame, a second frame, a first conductor, a second conductor, an array of nano-rods, and an array of electrodes. The second frame engages the first frame. The first conductor is fixed to a first inner surface of the first frame facing the second frame. The second conductor is fixed to a second inner surface of the second frame facing the first frame. The array of nano-rods extends from a first surface of the first conductor toward the second frame. The array of electrodes extends from a second surface of the second conductor toward the first frame. The array of electrodes corresponds to the array of nano-rods. The hardness of the array of electrodes is being greater than that of the array of nano-rods.

11 Claims, 4 Drawing Sheets

NANOGENERATOR

BACKGROUND

1. Technical Field

The disclosure generally relates to dynamos, and particularly to a nanogenerator.

2. Description of Related Art

As limited conventional resources are consumed, energy generation becomes more and more important, especially those of the renewable variety, such as wind energy, solar energy, and others. However, many potential sources of natural energy remain untapped.

What is needed, therefore, is a nanogenerator addressing the limitations described.

DETAILED DESCRIPTION OF THE EMBODIMENTS

Figure 1:
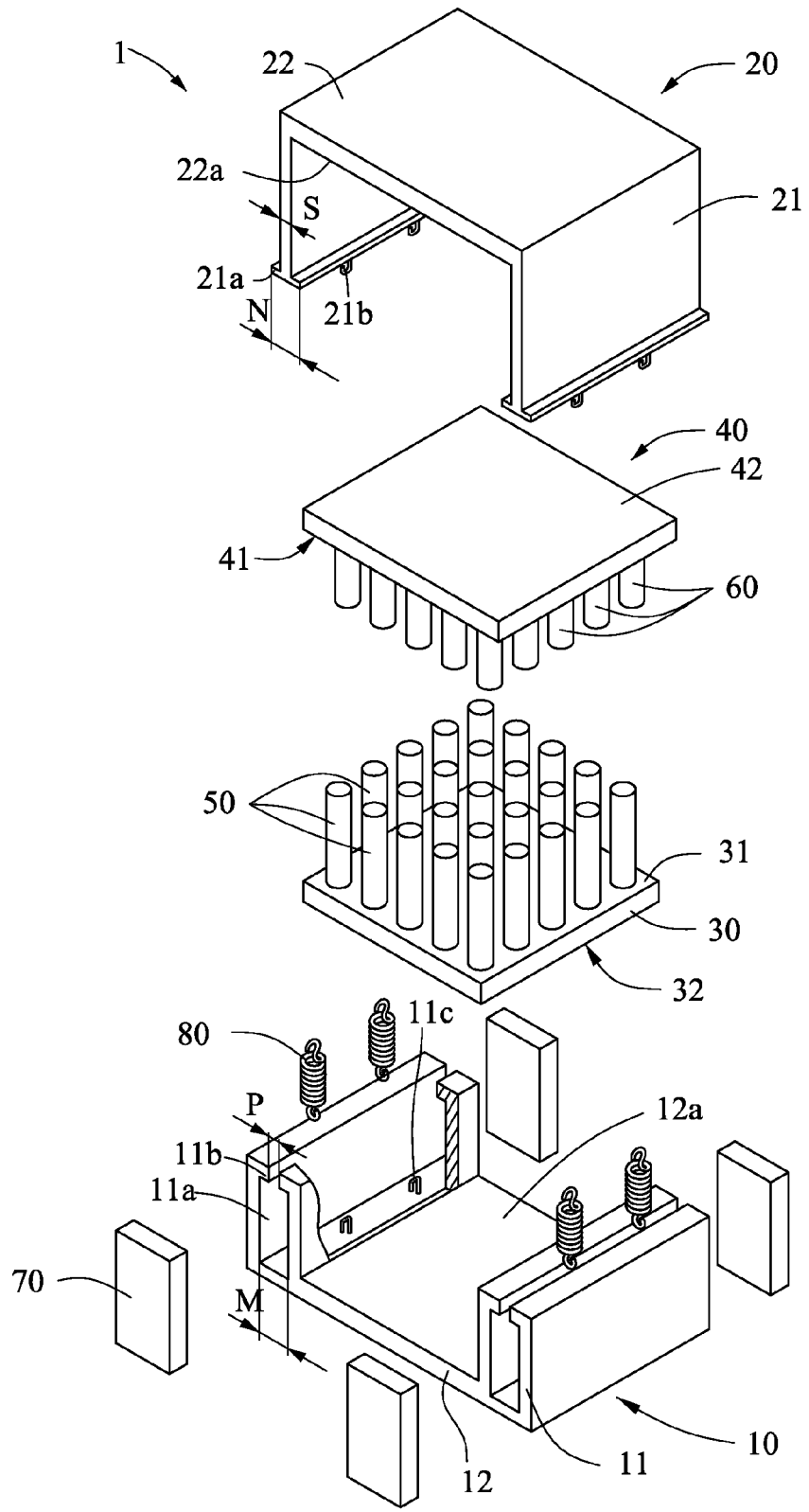
FIG. 1 is an exploded perspective view of a nanogenerator in accordance with the disclosure.

Referring to FIG. 1, a nanogenerator 1 in accordance with the disclosure includes a first frame 10, a second frame 20, a first conductor 30, a second conductor 40, an array of nano-rods 50, an array of electrodes 60, a plurality of covers 70 and a plurality of elastic elements 80.

The second frame 20 is comprised of insulating material, and includes a top wall 22, two parallel second sidewalls 21 extending downward from opposite sides of the top wall 22 respectively, and a second inner surface 22a. A stepped engaging portion 21a is formed on a free end of the second sidewall 21. Two second hooks 21b are formed in the lower surface of the engaging portion 21a. Here, the second hooks 21b are integrally formed with the engaging portion 21a.

The first frame 10 faces the second frame 20. The first frame 10 engages the second frame 20. The first frame 10 is comprised of insulating material and includes a bottom wall 12, two parallel first sidewalls 11 extending upward from opposite sides of the bottom wall 12 respectively, and a first inner surface 12a. The first sidewall 11 defines a groove 11a having a notch 11b. The groove 11a receives the engaging portion 21a of the second frame 20. The notch 11b receives the second sidewall 21 of the second frame 20. Two first hooks 11c are formed in the bottom of the groove 11a and corresponding to the second hooks 21b. Here, the first hooks 11c are integrally formed with the groove 11a. The width N of the engaging portion 21a is less than the width M of the groove 11a. The width N of the engaging portion 21a exceeds the width P of the notch 11b. The thickness S of the second sidewall 21 is less than the width P of the notch 11b.

The first conductor 30 includes a first surface 31 and an opposite second surface 32. The first conductor 30 is fixed to the first inner surface 12a of the first frame 10 facing the second frame 20. The array of nano-rods 50 extends from the first surface 31 of the first conductor 30 toward the second frame 20. The array of nano-rods 50 includes a plurality of rods of the same length and terminates at a common plane surface. The array of nano-rods 50 is comprised of a material, such as zinc oxide, aluminum nitride, or lead zirconate titanate.

The second conductor 40 includes a third surface 41 and an opposite fourth surface 42. The second conductor 40 is fixed to the second inner surface 22a of the second frame 20 facing the first frame 10. The first conductor 30 and the second conductor 40 are metal plates. The array of electrodes 60 extends from the third surface 41 of the second conductor 40 toward the first frame 10. The array of electrodes 60 includes a plurality of electrodes of the same length. The electrodes are comprised of metallic material. The array of electrodes 60 is conductive material, such as gold or copper. The hardness of the array of electrodes 60 is greater than that of the array of nano-rods 50. The array of electrodes 60 corresponds to the nano-threads of the array of nano-rods 50. As impact force of the array of electrodes 60 against the array of nano-rods 50 is minimal, lifetime of the array of nano-rods 50 can be prolonged.

The elastic element 80, such as an extension spring, is received in the groove 11a of the first sidewall 11. Opposite ends of the elastic element 80 engage the first hook 11c of the first frame 10 and the second hook 21b of the second frame 20. The covers 70 are fixed in the opposite side of each groove 11a, respectively closing off each groove 11a.

Figure 2:
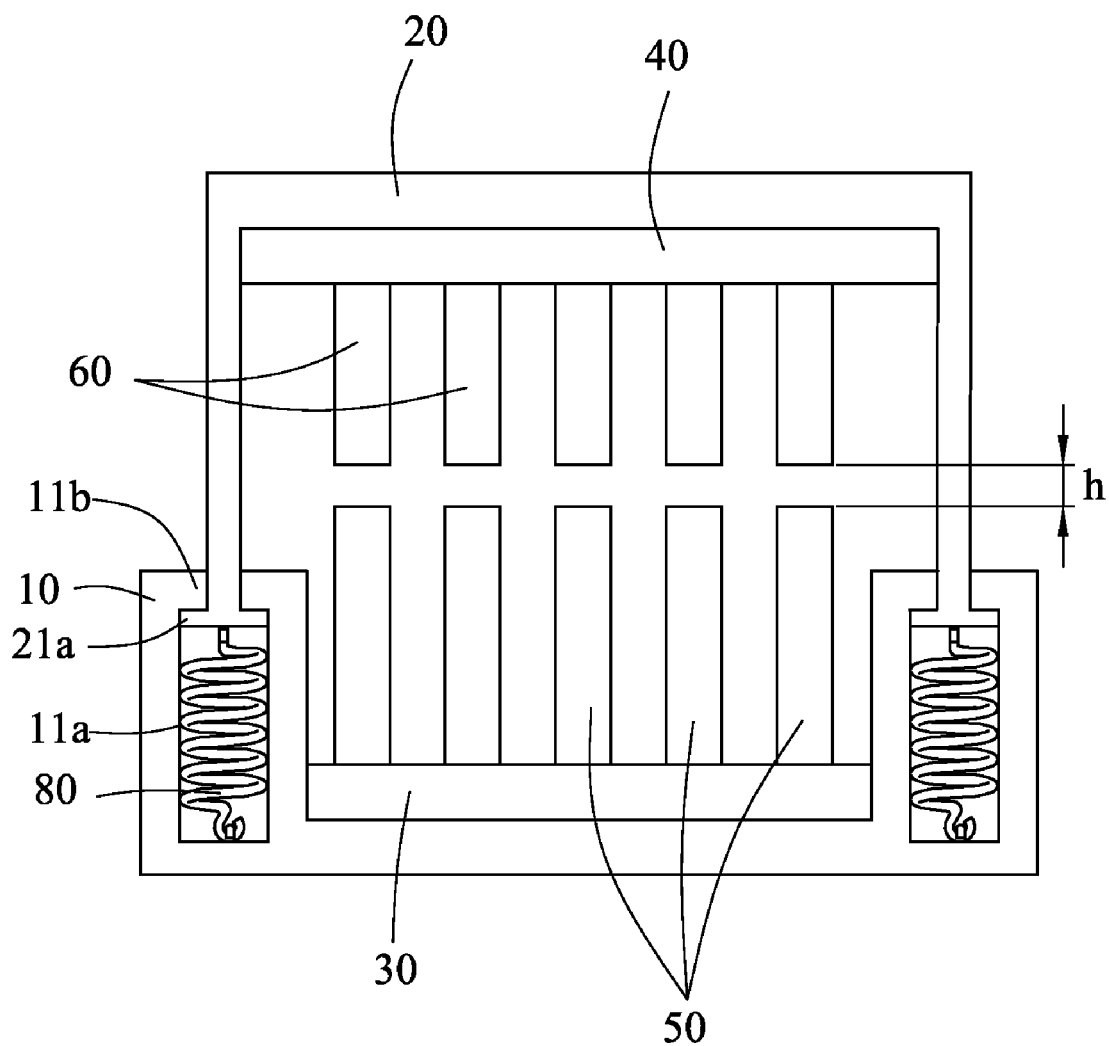
FIG. 2 is a sectional view of a nanogenerator in accordance with the disclosure.
Figure 3:
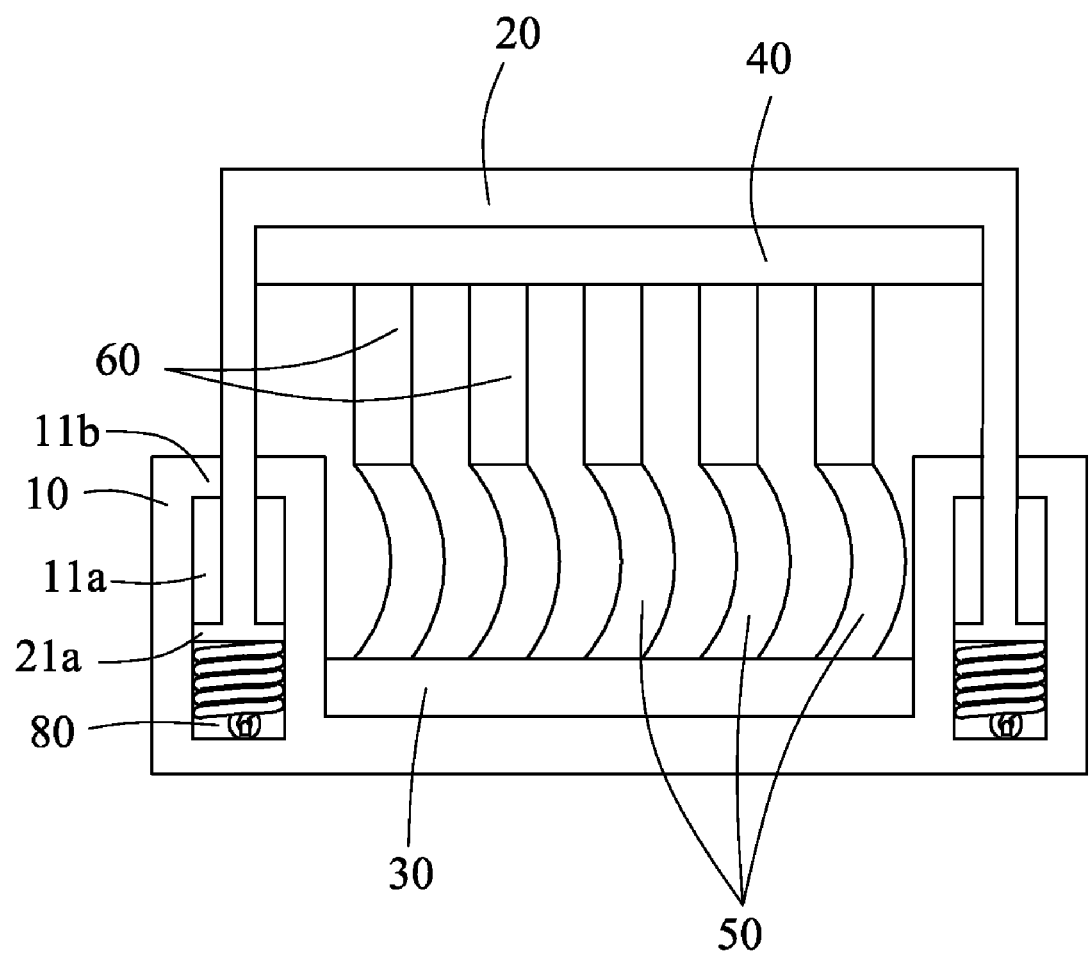
FIG. 3 is a sectional view of a nanogenerator in accordance with the disclosure, showing an array of electrodes pressed on an array of nano-rods.
Figure 4:
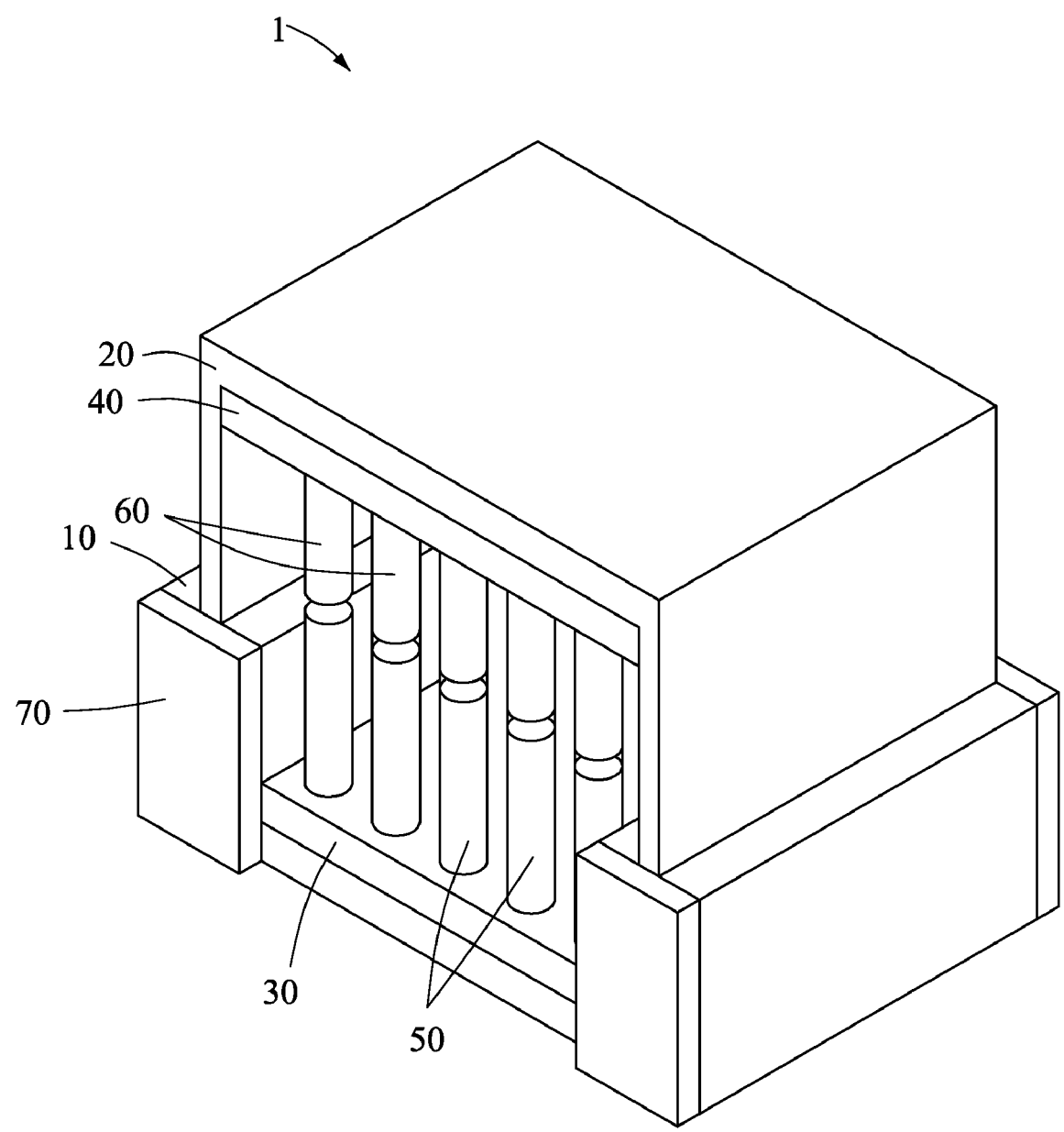
FIG. 4 is a perspective view of a nanogenerator in accordance with the disclosure.

Referring to FIG. 2, a distance h formed between the array of electrodes 60 and the array of nano-rods 50, when the elastic member 80 is in a natural state. Referring to FIG. 3, the array of electrodes 60 is pressed onto the array of nano-rods 50 by vibration energy. The array of nano-rods 50 is warped and generates electric charges via the first conductor 30 and second conductor 40, producing current.

The elastic elements 80 provide a pulling force between the first frame 10 and the second frame 20, when the array of electrodes 60 is not pressed on the array of nano-rods 50. The elastic elements 80 also provide an elastic force between the first frame 10 and the second frame 20, when the array of electrodes 60 is pressed on the array of nano-rods 50. Thus, the vibration energy between the first frame 10 and the second frame 20 is more uniform.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A nanogenerator, comprising:
    a first frame;
    a second frame engaging the first frame;
    a first conductor located on the first frame and facing the second frame;
    a second conductor located under the second frame and facing the first frame;
    an array of nano-rods located on the first conductor and extending from a first surface of the first conductor toward the second frame, the nano-rod array comprised of a piezoelectric material; and
    an array of electrodes located under the second conductor and extending from a second surface of the second conductor toward the first frame, the electrodes aligned with the nano-rods, a hardness of the electrodes being greater than that of the nano-rods.

2. The nanogenerator as claimed in claim 1, wherein the array of electrodes includes a plurality of rods of the same length, the rods terminating at a common plane surface.

3. The nanogenerator as claimed in claim 1, wherein the nano-rods have the same length and terminate at a common plane surface.

4. The nanogenerator as claimed in claim 3, wherein the electrodes are comprised of metallic material.

5. The nanogenerator as claimed in claim 1, further comprising an elastic element arranged between the first frame and second frame.

6. The nanogenerator as claimed in claim 5, wherein the array of electrodes is apart from the array of nano-rods, when the elastic member is in a natural state.

7. The nanogenerator as claimed in claim 1, wherein the nano-rods array is comprised of a material selected from the group consisting of zinc oxide, aluminum nitride, and lead zirconate titanate.

8. The nanogenerator as claimed in claim 1, wherein the array of electrodes is a material selected from the group consisting of gold and copper.

9. The nanogenerator as claimed in claim 1, wherein the first frame and the second frame are comprised of insulating material.

10. The nanogenerator as claimed in claim 1, wherein the first conductor and the second conductor are metal plates.

11. A nanogenerator, comprising:
a first frame;
a second frame being coupled to and movable toward and away from the first frame;
a first conductor attached to the first frame;
a second conductor attached to the second frame;
an array of nano-rods attached to the first conductor and electrically connected to the first conductor, the nano-rods comprised of a piezoelectric material;
an array of electrodes attached to the second conductor and electrically connected to the second conductor, the electrodes aligned with the respective nano-rods; and
a spring member arranged between the first frame and the second frame, the spring member being configured for operating at a natural state where each of the nano-rods is apart from the corresponding electrode, and a compressed state where each of the electrodes urges against the corresponding nano-rod and the nano-rods are deformed to create electric power.

\* \* \* \* \*